United States Patent
Abromavage et al.

[15] 3,638,641
[45] Feb. 1, 1972

[54] MULTIPHASIC MEDICAL EXAMINATIONS SCREENING LABORATORY CONSTRUCTION

[72] Inventors: John C. Abromavage, Tempe; James F. George, Phoenix, both of Ariz.

[73] Assignee: Arcoa, Incorporated, Phoenix, Ariz.

[22] Filed: Nov. 19, 1969

[21] Appl. No.: 878,094

[52] U.S. Cl. .................................................128/2 R
[51] Int. Cl. ..................................................A61b 05/10
[58] Field of Search .............128/2, 1, 2 R; 52/302, 303, 52/404, 407; 181/33

[56] References Cited

UNITED STATES PATENTS

| | | | |
|---|---|---|---|
| 3,107,974 | 10/1963 | Potapenko | 128/1 R X |
| 3,252,258 | 5/1966 | Blickman et al. | 52/404 X |
| 3,282,003 | 11/1966 | Swift, Jr. | 52/404 X |
| 3,305,993 | 2/1967 | Nelsson | 52/404 X |
| 3,417,839 | 12/1968 | Lowry et al. | 181/33 X |
| 3,470,871 | 10/1969 | Shoen | 128/2 R |

*Primary Examiner*—Hugh R. Chamblee
*Attorney*—David H. Semmes

[57] ABSTRACT

Multiphasic medical examinations screening laboratory of a type where a test sequence phase is separated from a self-administered history phase, wherein a plurality of wedge-shaped test chambers surround a central core area and constitute the test sequence phase area, each test chamber containing all instruments and leads to perform predetermined tests, inexpensive instruments being located in each test chamber and expensive equipment being centrally located in the central core and interconnected with each test chamber via a cable, with still further expensive equipment mounted on a track above the wedge-shaped test chambers adapted for selective placement in each chamber, wherein the construction and arrangement of various features are such as to provide optimum facility use, convenience, privacy, safety and practice of medical examinations within the purview of the process.

13 Claims, 17 Drawing Figures

PATENTED FEB 1 1972 3,638,641

INVENTORS
JOHN C. ABROMAVAGE
JAMES F. GEORGE

ATTORNEY

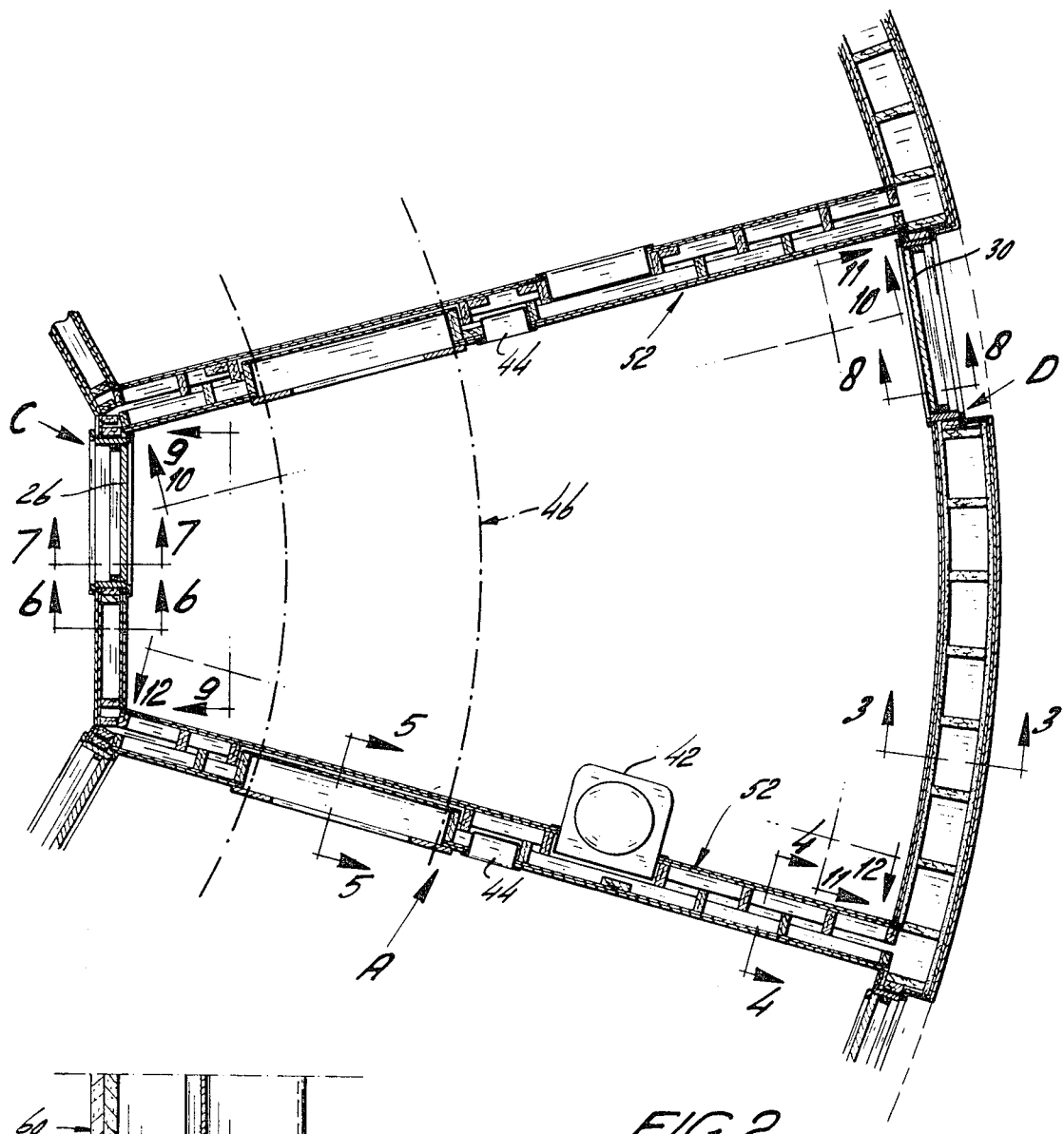
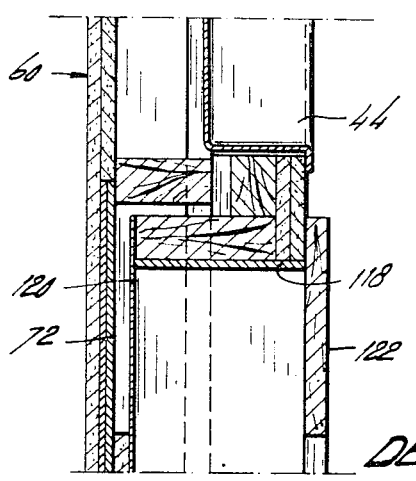
FIG. 2
DETAIL "A"

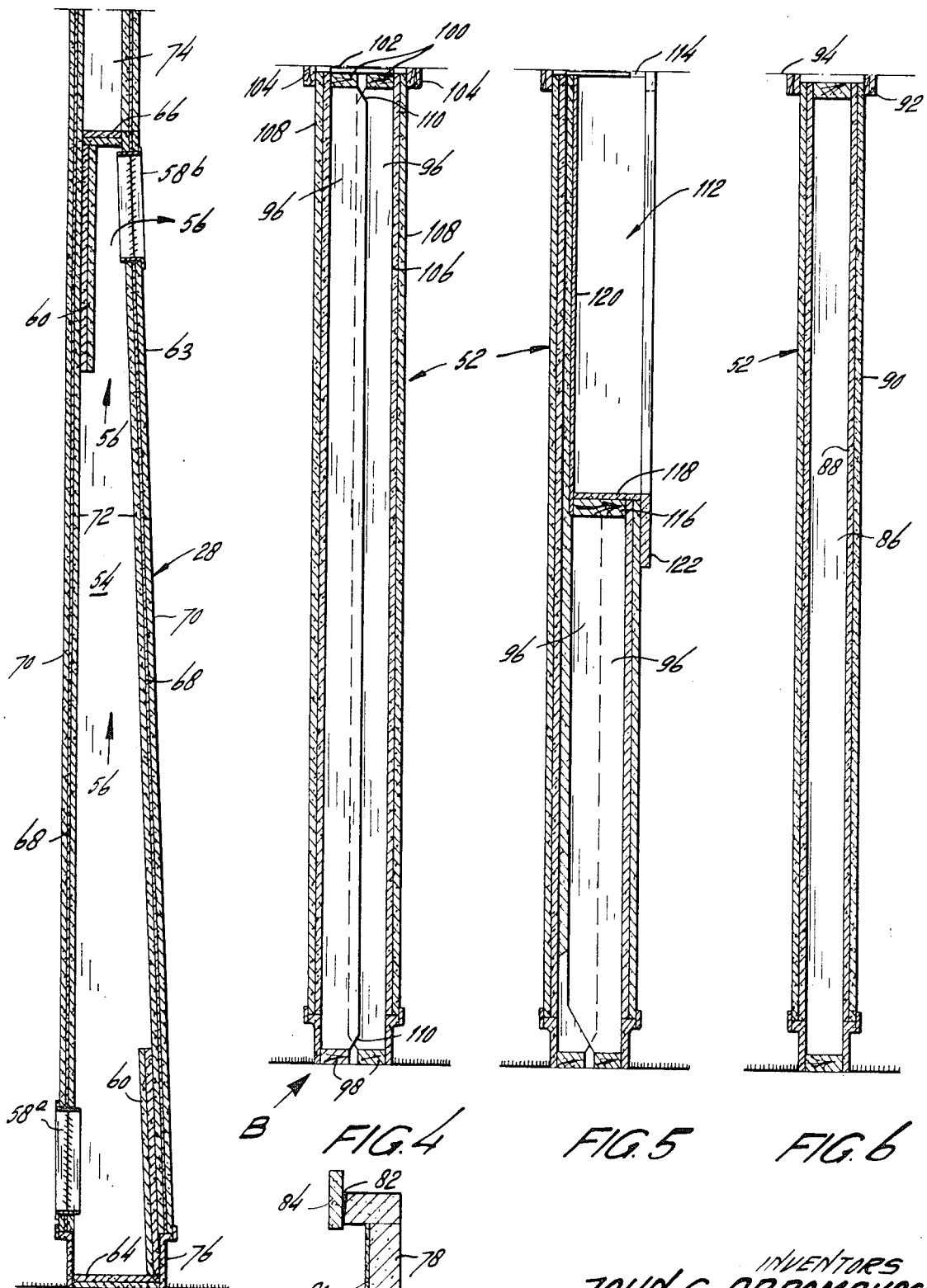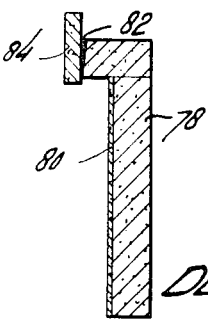

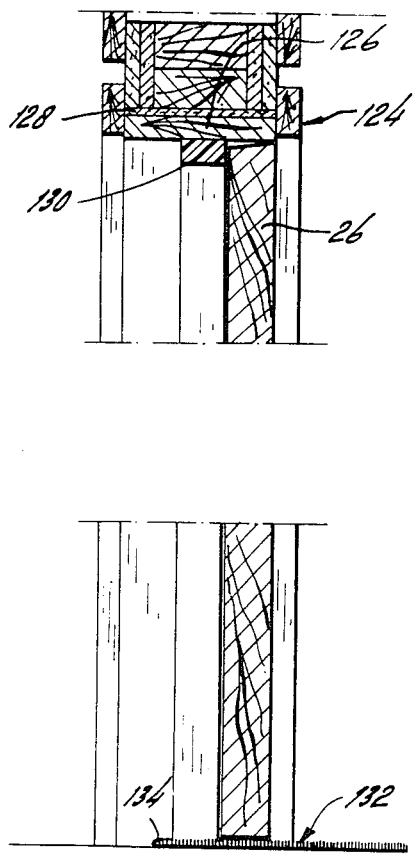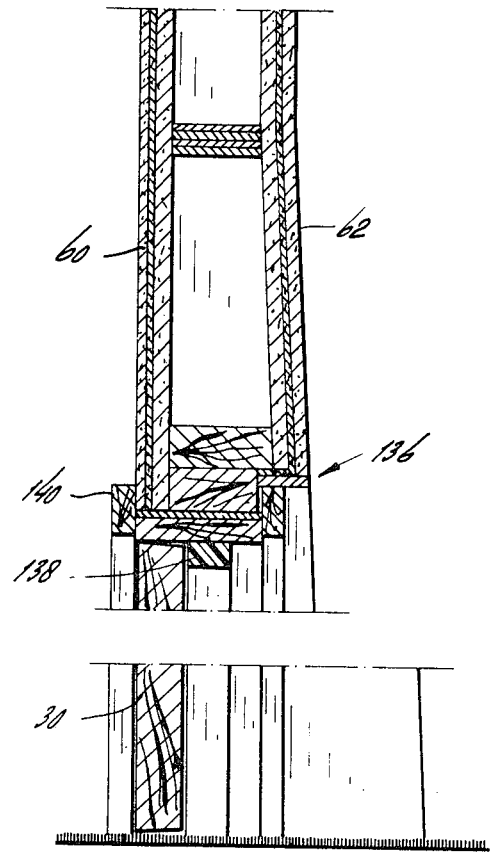
FIG. 7  FIG. 8
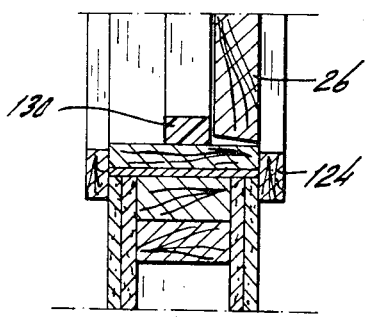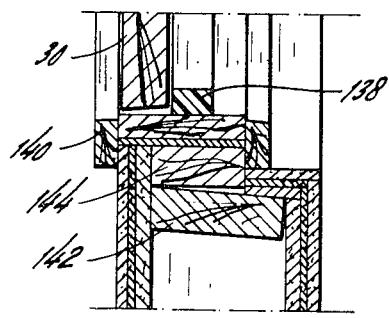
DETAIL "C"  DETAIL "D"

INVENTORS
JOHN C. ABROMAVAGE
JAMES F. GEORGE

David H. Semmes
ATTORNEY 3,638,641

MULTIPHASIC MEDICAL EXAMINATIONS SCREENING LABORATORY CONSTRUCTION

BACKGROUND OF THE INVENTION

Multiphasic screening constructions and laboratories have been devised which have drawbacks in construction, arrangement and use. A substantially improved multiphasic screening laboratory is shown and described in preceding U.S. Pat. No. 3,470,871, dated Oct. 7, 1969, entitled MULTIPHASIC SCREENING LABORATORY FOR CONDUCTING MEDICAL EXAMINATIONS, and assigned to a common assignee of the present application. The present application constitutes improvements over the construction and arrangements of the aforesaid patent.

The present invention incorporates the same basic facilities as contemplated and set forth in said prior patent, and reference is made thereto for the general method of conducting the medical examinations. This prior patent sets forth various instruments classifiable as inexpensive, and more expensive types which are arranged in the laboratory in a manner to minimize costs of equipment and at the same time permit a highly efficient examining procedure.

SUMMARY OF THE INVENTION

The present invention constitutes an improvement in construction and arrangement for highly efficient use of the basic method for conducting multiphasic medical examinations in a screening laboratory, wherein the test sequence phase is separated from the history phase and the present invention is directed primarily to the construction and arrangement of the facilities for the test sequence with improvements in facility use, convenience, privacy and safety. Additional objects and advantages of the invention will be more readily apparent from the following detailed description of an embodiment thereof taken together with the accompanying drawings in which:

FIG. 2 is an enlarged fragmentary plan view of a single test chamber for the laboratory;

FIG. 3 is an elevational view taken on line 3—3 of FIG. 2;

FIG. 4 is an elevational sectional view taken on line 4—4 of FIG. 2;

FIG. 5 is an elevational sectional view taken on line 5—5 of FIG. 2;

FIG. 6 is an elevational sectional view taken on line 6—6 of FIG. 2;

FIG. 7 is an elevational sectional view taken on line 7—7 of FIG. 2;

FIG. 8 is an elevational sectional view taken on line 8—8 of FIG. 2;

Details A, B, C and D are enlarged fragmentary sectional views of the portions of the construction indicated in FIG. 2 of the drawings.

DESCRIPTION OF THE PREFERRED EMBODIMENTS

Figure 1:
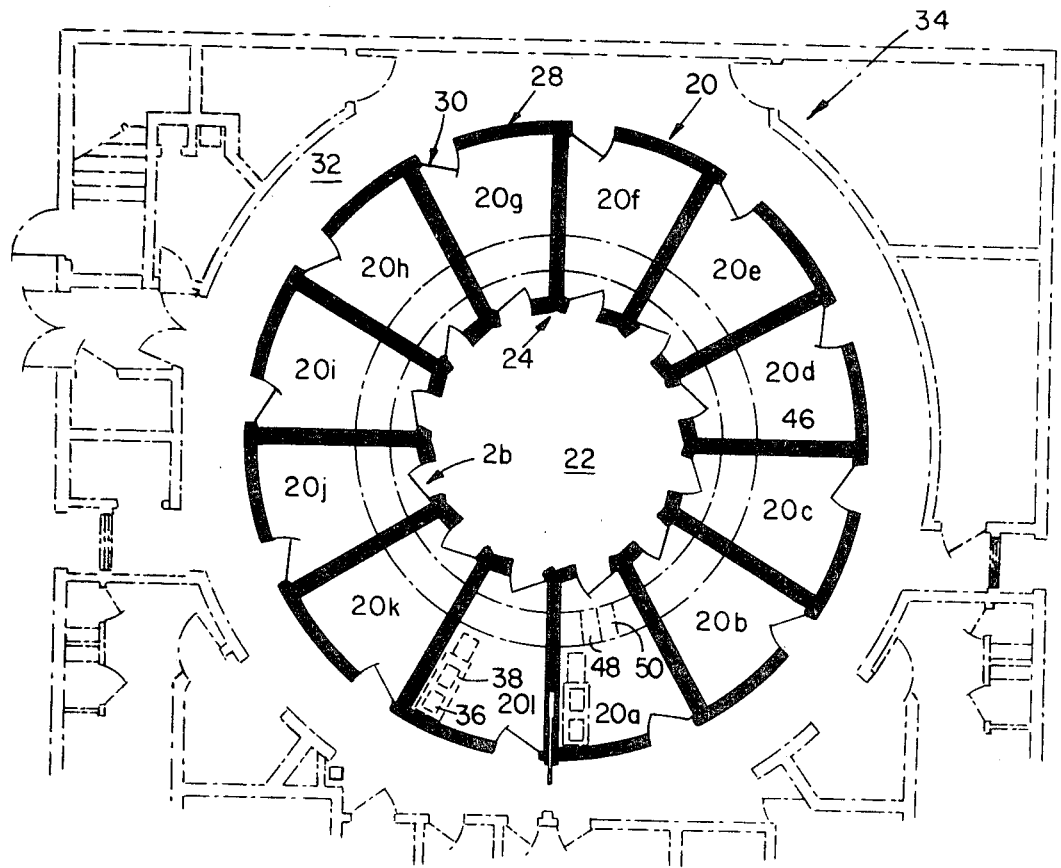
FIG. 1 is a floor plan illustrating a multiphasic screening laboratory with emphasis on a test sequence phase laboratory portion.

Referring now in more detail to the drawings, in FIG. 1 there is shown for a multiphasic screening laboratory a test sequence portion 20 consisting of a plurality of individual wedge shaped test chambers 20A–20L, 12 in number in a circular array about a central core 22 and separated therefrom by an inner wall or partition 24 with a plurality of individual doors 26 intercommunicating the central core and the individual test chambers. An external wall or partition 28 forms the outer extremities of the individual test chambers and doors 30 provide external access to a plurality of additional spaces or rooms suitable for additional functions such as test, clerical, storage space etc., and this portion of the construction is indicated generally in broken lines at 34. This latter portion 34 can comprise a portion of the history phase of the examination laboratory, the details of which are not shown and reference is here made to the aforementioned patent disclosing the overall laboratory arrangement.

Each of the individual test chambers associated with the central core contains all the instruments and connecting leads to perform all the predetermined tests. Inexpensive instruments such as used in visual acuity or tonometry, for example, are provided in each test chamber such as indicated for example as consisting of a visual acuity test device 36 (Protect-O-Chart (AO) through mirror to screen), a tonometry test device 38 (Schiotz Tonometer and Ophthaine Anesthetic) and a table 40 usable for a patient for drop installation to dilate the pupil for the tonemetry examination. Additional items can be included in the individual test chambers for convenience and of an inexpensive nature. In this connection for example a lavatory 42 (FIG. 2) is included for obvious reasons, and an additional recessed area 44 is adapted to contain a paper disposal unit, not shown, preferably of stainless steel or the like. Such additional equipment of the type referred to can be incorporated in the structure of the individual test chamber as desired.

In the overall laboratory as shown and described in detail in the above mentioned patent, expensive equipment is located within the central core 22 and while not shown can consist in, for example, an audiometer, electrocardiograph, blood pressure measuring device, pulse measuring device, temperature measuring device, respiration measuring device, etc. Each of these measuring devices in the central core is connected to each of the test chambers via a set of cables, not shown, for each of the test chambers.

Test devices or equipment defined as more expensive is mounted on a circular track, shown in broken lines at 46, which is located above the individual test chambers and preferably positioned in proximity to the inner wall 24. Such more expensive equipment can for example consist of a spirometer indicated as 48 (Med-Science-Model 470) and a fundus camera as at 50 (Carl Zeiss). These more expensive items of equipment are adapted to be circularly moved by means of a roller carriage 49 on the overhead track 46 in juxtaposition over each of the individual test chambers in any desired sequence, phase or manner. A ceiling door 51, of any desired construction, is provided in each test chamber ceiling 53 which can be opened or closed as desired and are adapted for the passage or lowering therethrough of a piece of more expensive equipment from the track into the individual test chambers by raising or lowering means generally indicated at 55. After the various tests on a patient from the inexpensive and expensive equipment have been effected and in proper phase with the test, the instruments such as the spirometer 48, fundus camera for retinal photo 50, etc., and when required lowered into the individual test chambers and subsequent to use elevated therefrom and cycled to a next succeeding desired test chamber.

As pointed out in the aforementioned patent multiple advantages are realized by this overall multiphasic screening concept characterized by the multiple test chambers radiating from a central core with a separate history area with a maximum of flexibility, space utilization and patient and examiner convenience and efficiency.

The arrangement is also susceptible of incorporation in an overall testing laboratory with easy and convenient access into the individual test chambers in conjunction with other test areas, and a proper programming of the test procedures with a minimum of inconvenience to testing technicians and patients and with obtained optimums in time, space, privacy, etc., as will be readily apparent and as more detailed in the aforesaid patent.

The circular array of individual test chambers are formed between inner and external walls 24 and 28 by means of partitions generally designated 52.

A heating, ventilating and air conditioning system is incorporated in the structure. To this end, and in accordance with additional structural features, the external wall 28 (FIG. 3) is hollow thereby providing a plenum chamber 54 adapted for incorporation in a return air system in a manner generally designated by arrows at 56, with access provided by return air grills 58 A and B located in proximity to the floor and ceiling respectively. Preferably extra layers, as shown consisting of 2, at 60 of acoustical board are arranged at each grill location (FIG. 3) for heat and sound stability as will be understandable. Also as seen from FIG. 3 the external wall 28 has an inner vertical face 61 and a corridor face 63 which is sloping. The inner vertical face is required for arrangement of certain test equipment and to facilitate placement thereof within the test chamber as will be apparent hereinafter. The corridor face being sloped adds not only to structural strength but adds to the esthetic aspects of the structure.

Specific features of the overall external wall construction are clearly shown in FIG. 3. A curved base plate generally designated 64 preferably consists of two layers of for example ½-inch plywood and an upper spacer 66 of a like curved composite construction is provided intermediate the wall faces and positioned above the upper return air grill as shown. The inner and outer faces 61 and 63 consist of an inner layer 68 of gypsum board and a facing gypsum board layer 70, with interior layers 72 of acoustical board for heat and noise accommodation. Studs such as at 74 are incorporated above spacer 66. A base 76 (see FIGS. 3 and Detail B) includes a lower portion 78 of wood to which, for example a formica layer 80 is glued and saw cuts such as generally indicated at 82 are provided in the top of the base to bend the base on the desired curve. An inner facer strip 84 is attachable to the base and in a usual manner is coactible with the surface comprising the wall line.

The inner wall or partition 24 is shown in section in FIG. 6, and includes spaced studs 86 vertically disposed in a usual manner with a layer of acoustical board 88 and a facer gypsum board 90. Upper trim strips 92 are provided adapted for coacting trim below an acoustical tile ceiling indicated generally by broken line at 94.

A section through a partition wall 52 is shown in FIG. 4. Spaced vertical studs 96 are utilized mounted on base plates 98 and having caps 100 with a tie 102 for nailing to the top of the wall. Trim strips 104 are used exteriorally of inner layers of acoustical board 106 and outer gypsum board layers 108. The ends of the studs are cut at 110 to avoid touching adjacent base members 98 and caps 100.

Figure 1A:
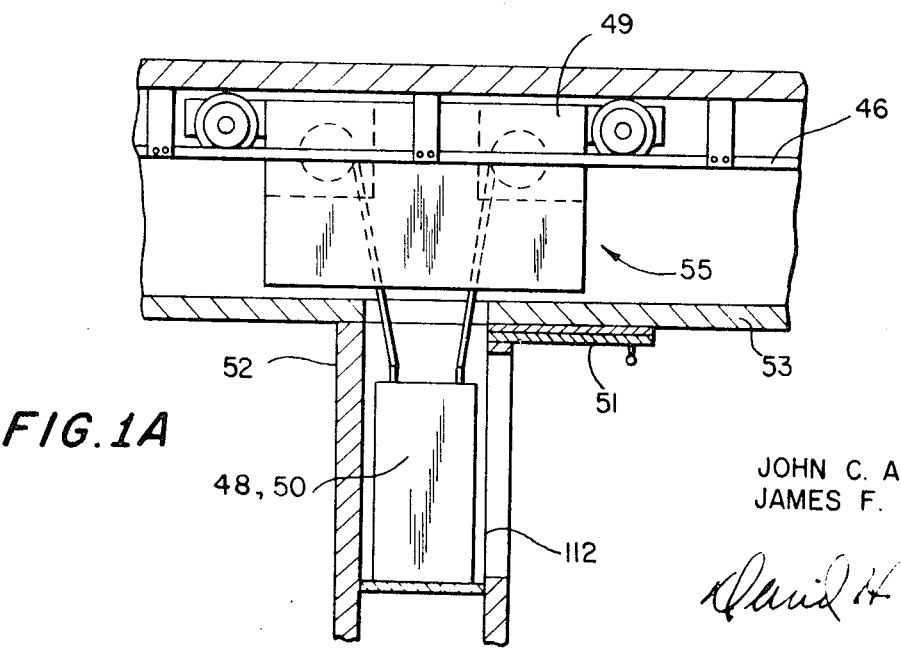
FIG. 1A is a schematic, elevational view of a portion of a single test chamber with cooperating mechanism for lowering test equipment from above.

As set forth hereinabove certain test equipment is carried on the circular overhead track and selectively positioned within the individual test chambers. To this end the partitioned walls are formed, as shown in section in FIG. 5 and in elevation in FIG. 10, with recesses or openings 112 which open at the top as at 114 and communicate with ceiling door 51 to permit an instrument, such as shown in FIGS. 1 and 1A at 48, 50, to be lowered from the track into the opening 112 within the test chamber. Generally the wall construction is similar to that shown and described with reference to FIG. 4 but is modified in an upper area to contain the opening 112. In the area of the recess the studs 96 terminate with a cap 116 which is horizontally disposed, topped by a cap or facer or sill type construction 118 which can be of masonite and the interior of the recess outline can also be faced with respect to the inner peripheral surfaces in a like manner. A lead sound shield 120 is attached at the rear surface of the recess opening. A trim strip 122 is secured on the inner face of the wall below the recessed opening. This recess being open at the top permits lowering into proper position for testing of the more expensive testing equipment. Additional details of this construction and including the paper disposal unit are shown in Detail A, incorporated at 44 in the partitions.

Figure 9:
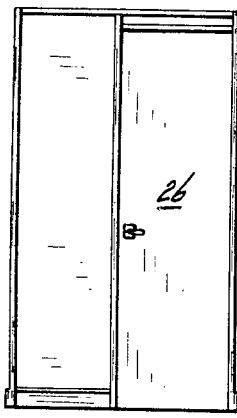
FIG. 9 is an elevational view taken on line 9—9 of FIG. 2.

An inner door, and wall construction for coaction and mounting thereof, is shown in FIGS. 7 and 9. The door 26 is hingedly mounted in a door jam and frame generally designated 124 and includes wall and door headers 126 with a shim space being provided at 128. The door 26 preferably consists of a solid core door and a neoprene stop 130 is provided around the inner door frame area. As shown in the lower portion of FIG. 7 a carpet and pad 132 are mounted on the floor surface and terminates in a carpet stop 134. A close door fit and the structural details ensure sound proofing and privacy for the testing technician and the patient.

Figure 11:
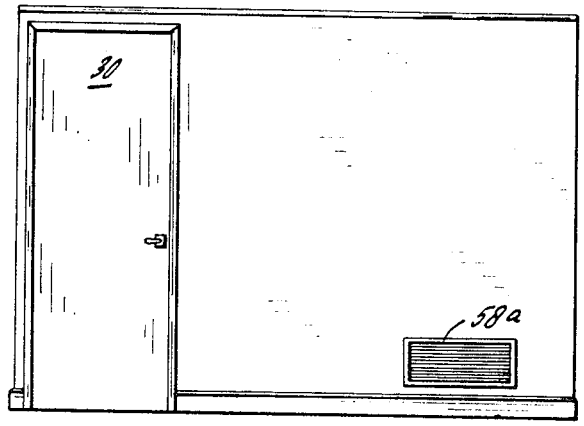
FIG. 11 is an elevational view taken on line 11—11 of FIG. 2.

The opening and mounting for outer doors 30 is more clearly seen from FIGS. 8 and 11 of the drawings. The door frame and jam as shown in FIGS. 8 and Detail D is generally designated 136 and includes a neoprene stop 138 and trim 140. Appropriate studs and bucks 142, 144 provide the floor jam in a usual manner.

Figure 10:
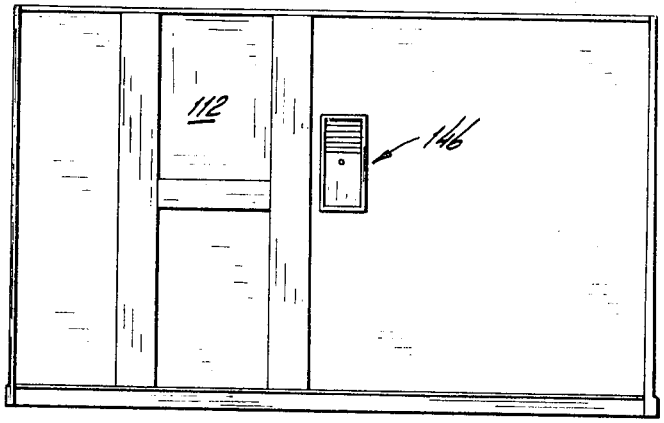
FIG. 10 is an elevational view taken on line 10—10 of FIG. 2.

A utility cabinet is shown at 146 for example in FIG. 10, which can incorporate the paper disposal unit 44 and/or storage, with slidable or hinged closure means as desired.

Figure 12:
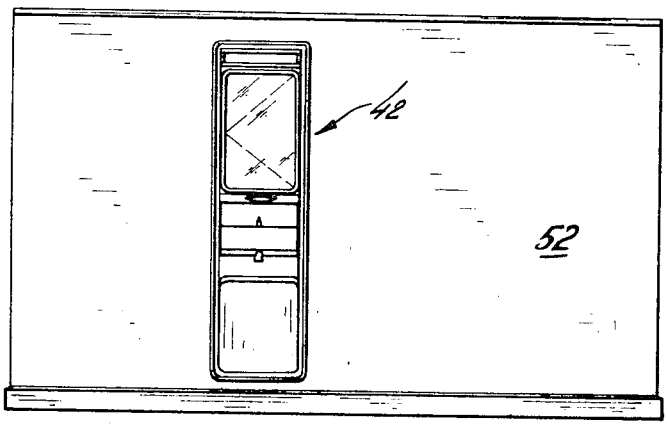
FIG. 12 is an elevational view taken on line 12—12 of FIG. 2.

The utility unit 42 is also at least partially recessed in a partition wall as shown in FIGS. 2 and 12 and the necessary hot, cold, and waste plumbing is incorporated and preferably terminating with the recessed opening for the lavatory. Any desired type of lavatory installation can be used, and preferably is foldable or storable which can pull out of the wall for use, and then be retracted for clearance within the test chamber.

From the foregoing description, when taken together with the accompanying drawings, it will be readily apparent that the overall construction and arrangement will result in outstanding use characteristics providing for patient comfort, convenience, privacy, the sound proofed areas, facilities and equipment being positioned in areas and operable to utilize maximum available space within the design features of the construction.

Manifestly additional features and/or details in construction can be incorporated in the invention without departing from the spirit and scope thereof as defined in and limited solely by the appended claims.

We claim:

1. A wedge-shaped medical examination room adapted for juxtaposition in a circular array thereof comprising:
   A. an inner planar end wall, an outer arcuate end wall and planar sidewalls;
   B. said rooms in a juxtaposed array forming an interior central core and opening into a corridor surrounding the circular array;
   C. medical test equipment in said central core;
   D. medical test equipment in each said room;
   E. each said room having a ceiling access opening therein;
   F. a circular track positioned above the room array;
   G. medical test equipment movably carried on said track;
   H. a sidewall in said room having a vertically disposed recess therein opening inwardly into said room and communicating at the top thereof with said ceiling access opening, guide positioning members disposed about said recess, said recess being adapted for guided reception and placement of medical test equipment extended from said track for operative selective extension into individual rooms of said array through said access openings;
   I. said walls being hollow and at least said outer wall defining a plenum chamber;
   J. access doors in said inner and outer walls;
   K. each said wall being sound proofed; and
   L. said doors being in substantially airtight sealing engagement;

thereby constituting a sound and air proof room adapted for incorporation therein of an air ventilation system within the wall structure and adapted for recessed reception in the walls of test and accessory equipment.

2. A medical examination room as claimed in claim 1, air ventilation openings in the inner and outer faces of said outer wall respectively entering into said plenum chamber and constituting in part an air ventilation system within the wall structure.

3. A medical examination room as claimed in claim 2, and including sound proofing material positioned behind said ventilation openings in said outer wall for enhanced sound proofing characteristics of said room.

4. A medical examination room as claimed in claim 3, and including a lead sound shield at the rear of said vertically disposed recess.

5. A medical examination room as claimed in claim 4, and including guide members disposed on the rear and side surfaces of said recess, and externally arranged frontal guide members around the outer open end of said recess, said guide members coacting to guide and position medical test equipment extended from said circular track.

6. A medical examination room as claimed in claim 5, and further including a second vertically disposed recess in a said sidewall and lavatory accessories at least partially disposed and recessed within said second recess.

7. A medical examination room as claimed in claim 6, and including a further recess in a said sidewall, an accessory and disposal unit positioned in said latter recess, and being substantially contained within the outer confines of said wall.

8. A medical examination room as claimed in claim 1, wherein said outer wall has a vertical inner surface and an upwardly and inwardly sloping outer surface disposed toward the corridor formed about the circular array.

9. In a construction as claimed in claim 12, each said wall being sound proofed and said doors being in substantially air tight sealing engagement whereby each said chamber is substantially sound and air proof.

10. A construction as claimed in claim 9, and further including second and third vertically disposed recesses in a said sidewall, and lavatory and accessory and disposal units at least partially disposed and recessed within said second and third recesses whereby the interior of said chambers are relatively unencumbered.

11. In a construction as claimed in claim 10, wherein said outer wall has a vertical inner surface and an upwardly and inwardly sloping outer surface disposed toward said corridor, said inner wall being planar and said outer wall being arcuate and disposed toward and forming a circular corridor surrounding said circular array.

12. In a multiphasic medical examinations screening laboratory including a central core, a plurality of wedge-shaped test chambers surrounding the central core and together forming a circular array, a corridor surrounding the circular array, access doors in each test chamber opening into the central core and corridor respectively, a ceiling door in each test chamber adapted for selective extension therethrough of medical test equipment mounted above the chambers, the improvement comprising:

A. hollow inner, outer and partition walls defining a said test chamber;
B. one said partition wall having a vertically disposed recess therein opening inwardly into aid test chamber and communicating at the top thereof with said ceiling door, guide positioning members disposed about said recess, said recess being adapted for guided reception and placement of medical test equipment extended from said track for operative positioning in said chamber;
C. at least said outer walls constituting a plenum chamber; and
D. an air circulation system opening respectively from said plenum chamber to the interior and exterior of said outer walls.

13. A multiphasic screening laboratory comprising:
A. a central core
B. a plurality of wedge shaped test chambers surrounding said central core, each test chamber including:
  i. an inner door opening into said core;
  ii. an outer door; and
  iii. a ceiling door;
C. a corridor surrounding said test chamber and accessible through said outer doors;
D. medical testing equipment located within said central core and operatively connected to said test chambers;
E. medical testing equipment located within each of said test chambers;
F. a circular track supported above said test chambers;
G. medical testing equipment transportable upon said track extensible into said test chambers via said ceiling door in each chamber;
H. hollow inner, outer and side walls defining said test chambers;
I. one said sidewall in said chambers having a vertical recess therein communicating with said ceiling door, guides and positioning said medical testing equipment transportable upon said track for extension into said test chambers;
J. an air circulation system having openings into a said hollow well from said core and said corridor and comprising an air ventilation system portion;
K. said walls being sound proofed and said door openings being in airtight sealing engagement; and
L. said chambers being substantially sound and air proof.

* * * * *